US006468499B1

(12) United States Patent
Balachandran et al.

(10) Patent No.: US 6,468,499 B1
(45) Date of Patent: Oct. 22, 2002

(54) METHOD OF GENERATING HYDROGEN BY CATALYTIC DECOMPOSITION OF WATER

(75) Inventors: Uthamalingam Balachandran, Hinsdale, IL (US); Stephen E. Dorris, LaGrange Park, IL (US); Arun C. Bose, Pittsburgh, PA (US); Gary J. Stiegel, Library, PA (US); Tae-Hyun Lee, Naperville, IL (US)

(73) Assignee: Argonne National Laboratory, Argonne, IL (US)

( * ) Notice: Subject to any disclaimer, the term of this patent is extended or adjusted under 35 U.S.C. 154(b) by 0 days.

(21) Appl. No.: 09/590,460

(22) Filed: Jun. 9, 2000

(51) Int. Cl.[7] .................................................. C01B 3/08
(52) U.S. Cl. ..................... 423/657; 423/579; 423/648.1; 423/658
(58) Field of Search ................................ 423/657, 579, 423/648.1, 650, 651, 652, 658

(56) References Cited

U.S. PATENT DOCUMENTS

| | | |
|---|---|---|
| 4,207,095 A | 6/1980 | Anderson |
| 4,254,086 A | 3/1981 | Sanders |
| 4,342,738 A * | 8/1982 | Burgund ..................... 423/579 |
| 4,544,459 A | 10/1985 | Struck et al. |
| 4,889,604 A | 12/1989 | Khan et al. |
| 5,318,684 A | 6/1994 | Cameron |
| 6,235,417 B1 * | 5/2001 | Wachsman et al. ......... 423/650 |

OTHER PUBLICATIONS

Naito, H., et al., "Hydrogen production from direct water splitting at high temperatures using a $ZrO_2$–$TiO_2$–$Y_2O_3$ membrane," *Solid State Ionics*, vol. 79, pp. 366–370, 1995; published by Elsevier Science B.V. (No Month).

* cited by examiner

*Primary Examiner*—Wayne A. Langel
(74) *Attorney, Agent, or Firm*—Foley & Lardner (57) ABSTRACT

A method for producing hydrogen includes providing a feed stream comprising water; contacting at least one proton conducting membrane adapted to interact with the feed stream; splitting the water into hydrogen and oxygen at a predetermined temperature; and separating the hydrogen from the oxygen. Preferably the proton conducting membrane comprises a proton conductor and a second phase material. Preferable proton conductors suitable for use in a proton conducting membrane include a lanthanide element, a Group VIA element and a Group IA or Group IIA element such as barium, strontium, or combinations of these elements. More preferred proton conductors include yttrium. Preferable second phase materials include platinum, palladium, nickel, cobalt, chromium, manganese, vanadium, silver, gold, copper, rhodium, ruthenium, niobium, zirconium, tantalum, and combinations of these. More preferably second phase materials suitable for use in a proton conducting membrane include nickel, palladium, and combinations of these. The method for generating hydrogen is preferably preformed in the range between about 600° C. and 1,700° C.

25 Claims, 6 Drawing Sheets

METHOD OF GENERATING HYDROGEN BY CATALYTIC DECOMPOSITION OF WATER

STATEMENT REGARDING FEDERALLY SPONSORED RESEARCH

The United States Government has rights in this invention pursuant to Contract No. W-31-109-ENG-38 between the United States Department of Energy and the University of Chicago representing Argonne National Laboratory.

FIELD OF THE INVENTION

This invention relates generally to the field of hydrogen production and more specifically relates to methods of producing hydrogen by catalytic decomposition of water.

BACKGROUND OF THE INVENTION

Concerns over global climate change are driving nations to reduce emissions of carbon dioxide to the atmosphere. Carbon dioxide is one compound believed to have a major impact on the earth's thermal balance, thereby causing warming of our planet. Almost all of this carbon dioxide is produced in one way or another from fossil fuels such as coal, petroleum, and natural gas. There is a need to responsibly meet the 21st century energy needs in an environmentally benign manner.

In response to global climate change concerns, hydrogen is considered the fuel of choice for both power and transportation industry sectors. Its combustion product is water, not carbon dioxide. Hydrogen is also a valuable raw material for several major applications including refining and the manufacture of chemicals (e.g., ammonia). Hydrogen turbines are envisioned for electricity generation in the future and fuel cells are expected to power the transportation sector. These applications would significantly increase the demand for hydrogen.

Hydrogen is currently produced from fossil fuels such as natural gas by either steam reforming or partial oxidation. Steam reforming is a capital- and energy-intensive process. The process is thermally inefficient, and a portion of the feedstock must be burned to supply the energy to sustain the process, thereby generating some carbon dioxide. Partial oxidation is an exothermic reaction, but is again, very capital intensive. The hydrogen concentration in the product stream is lower than the steam reforming process and may not be suitable for many desired end products. To produce additional hydrogen from either process or to adjust the composition of the product gas, a water gas shift reaction is usually employed. This reaction further exacerbates the generation of carbon dioxide.

Separation of hydrogen from steam reformer or partial oxidation process product streams is another challenge. Pressure Swing adsorption or separation by membranes are some options. Current membrane systems, however, require a large pressure drop and gas recompression for downstream processes, are susceptible to chemical damage from trace sulfur compounds and aromatics, and have limited temperature and pressure tolerances. Polymeric membrane are low-temperature processes and, in general, separation by size-exclusion filtration does not yield industrially-significant hydrogen flux. Palladium-based membranes can separate hydrogen, but thin depositions of palladium on suitable porous substrates are not yet commercial. Hydrogen flux, is therefore, unacceptably low for palladium-based separation processes.

With concerns over global warming and the potential for hydrogen as the fuel of choice in the future, there is a need for more efficient and cost-effective means of producing large quantities of hydrogen without the attendant disadvantages of conventional technologies. In particular, a need exists to manufacture high-volume merchant hydrogen from low-cost feedstock, especially renewable resources, such as water, by an efficient, low-cost, and less energy intensive process. Hydrogen can be produced by the electrolysis of water, but the voltage required to split water molecules are excessive. Although food-grade hydrogen can be produced electrolytically, an electrically-driven process is not deemed to be commercially attractive for large scale applications.

Thin and dense ceramic membranes fabricated from mixed protonic and electronic conductors might provide a simple and efficient means for the production and separation of hydrogen from renewable resources. The preferred embodiment is a single step process that will split the water molecule into hydrogen and oxygen followed by separation of hydrogen via transport as proton through the membrane reactor wall thereby favoring the water splitting equilibrium towards the production of more hydrogen.

SUMMARY OF THE INVENTION

A method of producing hydrogen from water, in accordance with the present invention, comprises a method providing the removal of hydrogen from a gas stream, using mixed protonic/electronic conducting ceramic membranes.

The hydrogen producing method according to the present invention comprises the collection of hydrogen that is present in the gas stream as well as production of additional hydrogen by shifting equilibrium-limited reactions toward hydrogen products. In one exemplary embodiment of the present invention, a composite membrane is made from a proton conductor and a second phase material. The proton conductor preferably includes a lanthanide element, a Group VIA element, and a metal ion selected from the Group IA elements, Group IIA elements, and combinations of Group IA and Group IIA elements. More preferred proton conductors for use in the present invention include cerium, oxygen and a Group IA element such as barium or strontium. Still more preferred proton conductors also include yttrium. Preferred second phase materials include transition metals such as, but not limited to platinum, palladium, nickel, iron, cobalt, chromium, manganese, vanadium, silver, gold, copper, rhodium, ruthenium, niobium, zirconium, tantalum, or combinations thereof. Still more preferred second phase materials include nickel, palladium, niobium, or combinations thereof. A proton-conducting membrane is placed in an atmosphere that contains water and it generates hydrogen by catalyzing the splitting of water into hydrogen and oxygen and then separates the hydrogen from the oxygen. In preferred hydrogen-producing methods, separating the hydrogen from the oxygen further shifts the water splitting equilibrium toward the production of more hydrogen, which is collected by the proton-conducting membrane. The result is a plentiful supply of hydrogen at comparatively low temperatures.

It is one object of the present invention to provide a cost-effective means of producing hydrogen. To this end, a ceramic/metal composite is provided that catalyzes the splitting of water into hydrogen and oxygen. By decomposing water, which is a renewable resource, the cost of starting materials is reduced.

It is a further object of the present invention to provide large quantities of hydrogen. In the furtherance of this and other objectives, a method for producing large quantities of hydrogen is provided. In a preferred embodiment of the present invention, a mixed conductor composite membrane is provided. It is preferable that a proton conductor and a second phase material be provided. In a preferred embodiment in accordance with the present invention the proton conductor includes a lanthanide element, a Group VIA element, and a metal ion formed from a Group IA element, a Group IIA element, or combinations of these elements. More preferred proton conductors include cerium, oxygen and a metal ion of a Group IIA element such as barium, strontium, or combinations of these elements. Yttrium is included in more preferred proton conductors. More preferred second phase materials include nickel, palladium, niobium, or combinations of these materials.

Additional hydrogen may be produced, in accordance with the present invention, by shifting equilibrium-limited reactions toward the production of hydrogen. A preferred embodiment provides the splitting of hydrogen and oxygen coupled with the sequestration of the hydrogen in a single step. In a preferred embodiment in accordance with the present invention, hydrogen is collected by the proton-conducting membrane.

It is yet another object of the present invention to provide a method of producing hydrogen without producing undesirable byproducts. To this end, a mixed conductor membrane is provided.

Still another objective of the present invention is to provide a method of decomposing water into hydrogen and oxygen at temperatures below about 2,000° C. In the furtherance of this and other objectives, a ceramic/metal composite is provided to separate hydrogen from gas mixtures. This allows the process to be carried out at temperatures of about 900° C.

Further objects, features and advantages of the invention will be apparent from the following detailed description taken in conjunction with the accompanying drawings.

DETAILED DESCRIPTION OF THE INVENTION

The method of producing hydrogen according to the present invention comprises the steps of providing a feed stream that includes water; contacting at least one proton conducting membrane adapted to interact with the feed stream; splitting the water into hydrogen and oxygen at a predetermined temperature; and separating the hydrogen from the oxygen. In one exemplary embodiment of the present invention, the feed stream is a fluid such as water vapor or steam, the proton-conducting membrane adapted to interact with the feed stream is a mixed conductor composite membrane including a proton conductor and a second phase material, the predetermined temperature is in the range about 600° C.–1,700° C., and the hydrogen and oxygen are separated by the proton-conducting membrane.

The following terms are used in this application:

Decomposition of Water: The more or less permanent structural breakdown of a molecule into simpler molecules or atoms. In the case of water, decomposition consists in the breakdown of water into hydrogen and oxygen molecules.

Feed Stream: A continuously renewed source of a raw material, generally in liquid or gaseous (fluid) form, which is supplied to a machine or process component for purposes of extracting hydrogen therefrom.

Membrane: The ion-exchange medium through which a liquid or gas stream is passed for purposes of filtration and/or separation. For purposes of this invention, the membrane is comprised of a material such as, but not limited to, Ba—Ce—Y—O, $BaCeO_3$, or $SrCeO_3$ and a metal such as nickel, palladium, niobium, or combinations of these metals.

Ionic/Electronic Conductor: A particular type of material in which both ions and electrons participate in electrical conduction. In the present case, electrons and protons participate in conduction, where protons are an ionized form of hydrogen.

Proton Conductor: A particular type of material in which electrical conduction is by protons and the electronic contribution is negligibly small.

Second Phase Material: A catalytic metal component, having electron-transporting properties selected from the group consisting of platinum, palladium, nickel, iron, cobalt, chromium, manganese, vanadium, silver, gold, copper, rhodium, niobium, zirconium, ruthenium, tantalum, and combinations thereof or more preferably, palladium, nickel, niobium, or combinations of these transition metals.

Ceramic/Metal Composite: One requirement of the ceramic component of the membrane is that it have a high proton conductivity. Generally, such materials are acceptor-doped oxides. Generally, the suitability of the proton conductivity ceramic component candidates will depend on the stability requirements of the fabricated monolith composite. For example, more stable zirconate-based ceramic components may be preferable to cerates in extreme process environs. Suitable species of the above-discussed ceramic genuses include Fe:$LiNbO_3$, Y:$SrCeO_3$, Ni:$KTaO_3$, Y:$SrZrO_3$, Y:$BaSnO_3$, Nd:$BaCeO_3$, $SrCe_{1-x}M_xO_{3-\delta}$, $BaCe_{1-x}M_xO_{3-\delta}$, and $BaCe_{0.8}Y_{0.2}O_{3-\delta}$, where M represents trivalent species such as Gd, Nd, Y, etc. The last species ($BaCe_{0.8}Y_{0.2}O_{3-\delta}$) is an exemplary of the BCY-ceramic referred to throughout the specification.

Catalytic Decomposition of Water: The decomposition or splitting of water into hydrogen and oxygen, which is promoted, activated, or catalyzed by a surface containing certain species such as platinum, palladium, nickel, iron, cobalt, chromium, manganese, vanadium, silver, gold, copper, rhodium, niobium, zirconium, ruthenium, tantalum, and combinations thereof.

Figure 1:
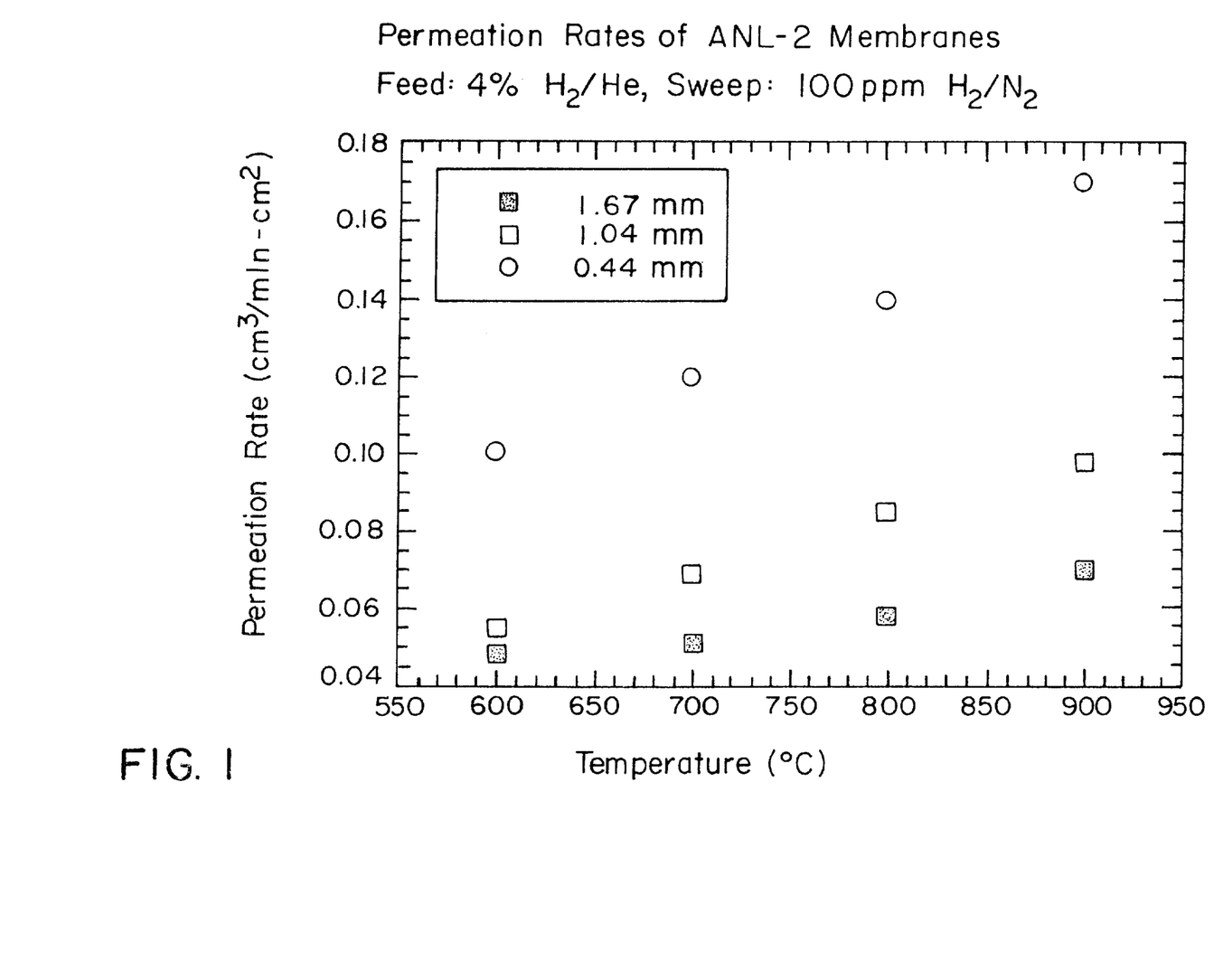
FIG. 1 is a graph depicting the hydrogen permeation rates of the membranes of the present invention.
Figure 2:
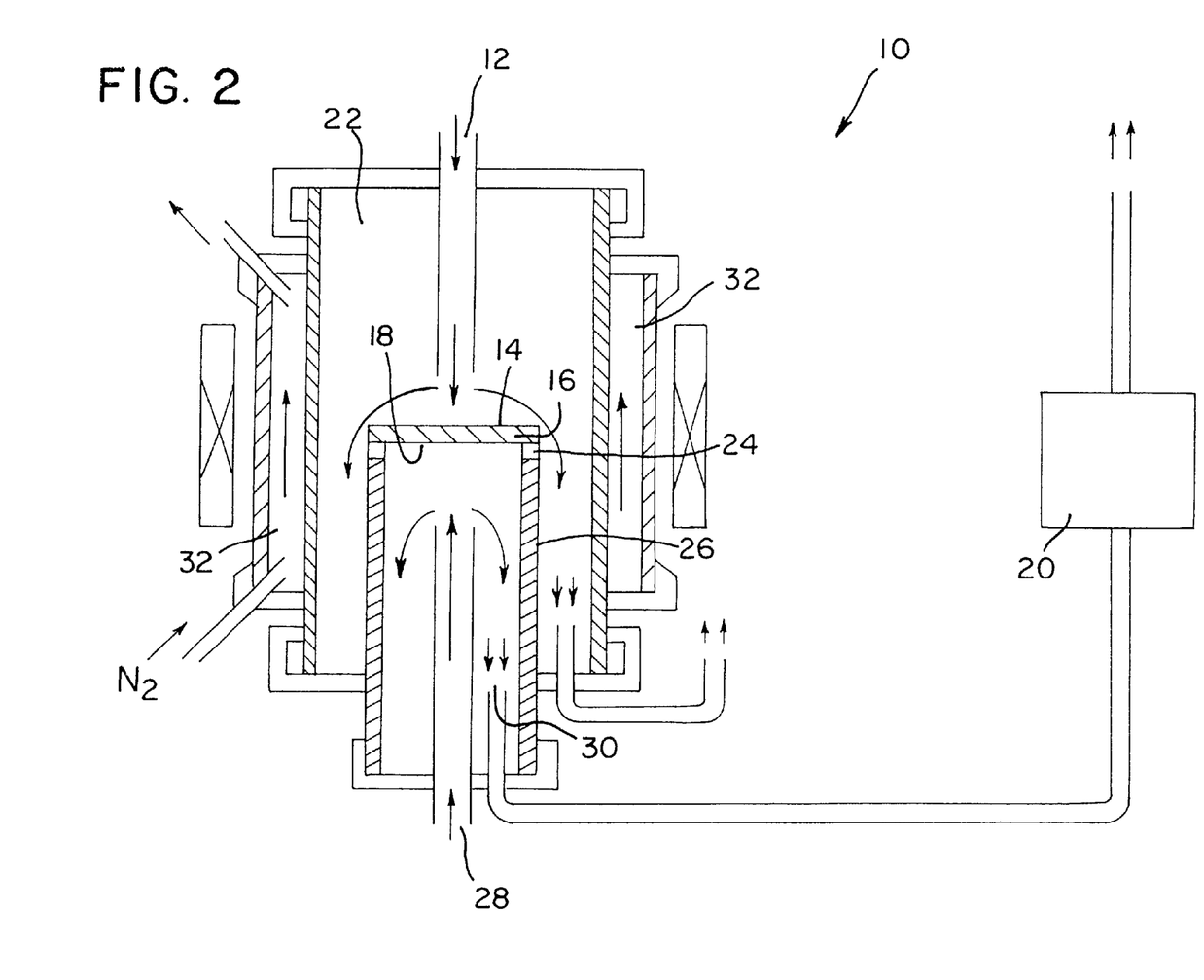
FIG. 2 is a schematic diagram of a membrane-containing apparatus used to measure hydrogen permeation, as used in and accordance with the present invention, for separating hydrogen from a feed stream of a fluid.
Figure 3:
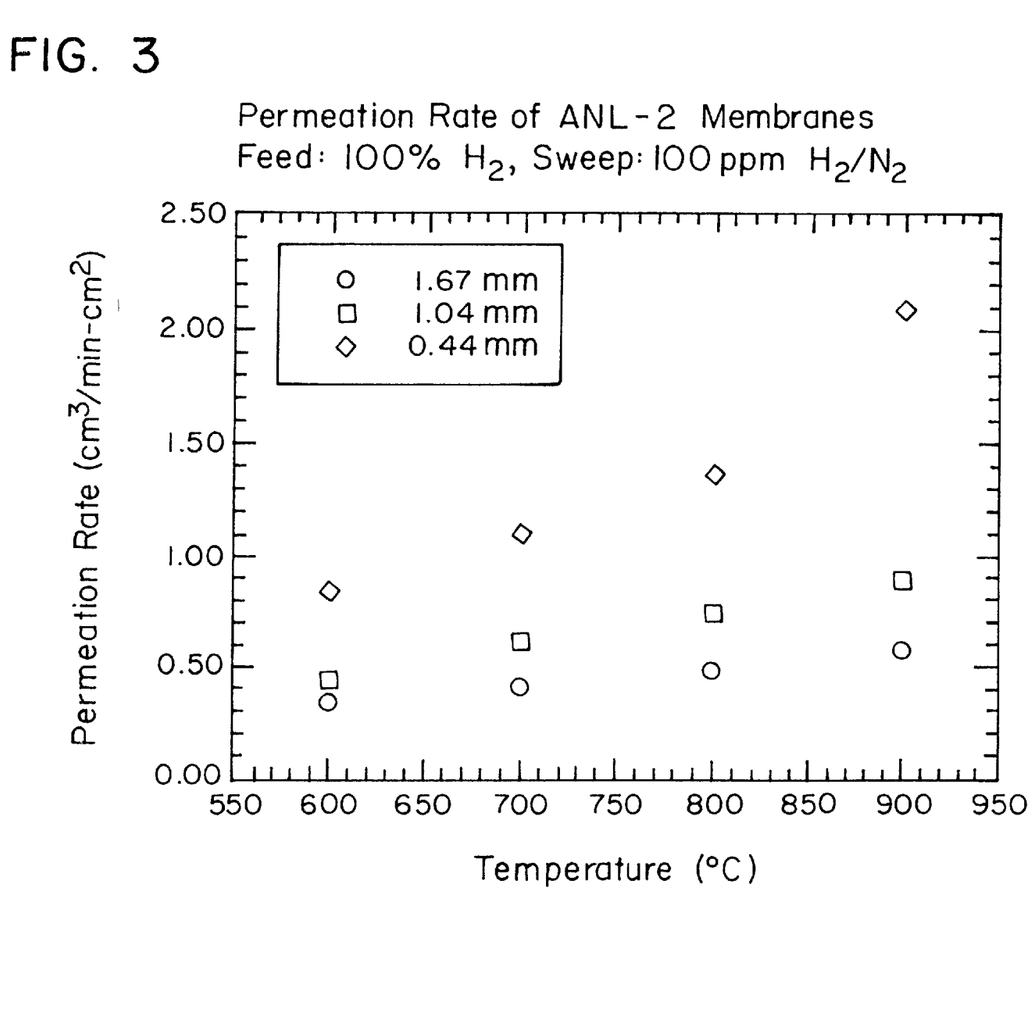
FIG. 3 is a graph depicting hydrogen permeation rates membranes of the present invention.

With reference to the drawings, wherein like numerals refer to like parts in each of the several views, a method of producing hydrogen is shown generally at FIGS. 1–3. In a preferred embodiment, shown in FIG. 2, a mixed conductor composite membrane is provided to catalyze the decomposition of water reaction.

The method in accordance with the present invention utilizes dense ceramic membranes comprising mixed protonic/electronic conductors. The membranes efficiently and economically separate hydrogen from feed fluids such as gaseous mixtures. This separation occurs in nongalvanic mode. The critical properties of the invented membrane include high protonic and electronic conductivities (i.e. protonic and electronic transport characteristics), catalytic behavior during the dissociation and recombination of hydrogen, and good material stability in hostile environments.

The membrane operates at a myriad of temperatures, including temperatures ranging from about 600° C. to about 1,700° C. More preferred temperatures range from about 800° C. to about 1,500° C. Still other preferred temperatures range from about 600° C. to about 1,000° C. and especially preferred temperatures ranges from about 600° C. to about 950° C. Generally, the membrane comprises a composite, mechanical mixture of a ceramic component and a catalytic metal component such that the mixture results in a monolith, preferably being substantially to completely homogenous throughout.

Generally, the catalytic component can be any electron-conducting metal. For example, the inventors have found that the incorporation of certain transition metals decreases the interfacial resistance and increases the electronic conductivity of any membrane produced from the composite, both of which would increase hydrogen permeation. One group of exemplary catalytic metal components (i.e., electron-transporting material) comprises platinum, palladium, nickel, iron, cobalt, chromium, manganese, vanadium, silver, gold, copper, rhodium, ruthenium, niobium, zirconium, tantalum, or combinations thereof. More preferred metals include palladium, nickel, niobium, and combinations of these metals.

A myriad of hydrogen-containing fluids are utilized as feedstocks, including, but not limited to, syn gas (CO+H2), coal gas, process gas, and combustion gas.

FIG. 1 depicts the hydrogen permeation rates of an invented membranes at various thicknesses. The membranes are more fully described in Example 1. The three curves in FIG. 1 represent the hydrogen permeation characteristics of the membrane. As can be noted in FIG. 1, the membrane has a high permeation rate for $H_2$ even at relatively high thicknesses and low hydrogen concentrations. Moreover, the permeation rate is relatively high at fairly low temperatures.

Higher permeation rates occur at higher hydrogen concentrations in the feed stream. For example, hydrogen permeation rates of from greater than 0.04 to greater than 0.17 $cm^3 min^{-1} cm^{-2}$ are achieved for a feed gas of 4 percent hydrogen gas. As shown in FIG. 3, permeation rates as high as approximately 2.1 $cm^3 min^{-1} cm^{-2}$ were experienced when 100 percent hydrogen feed gas concentrations (1 atm pressure) were utilized. These permeation rates are superior to those of BCY-only membranes which experienced permeation rates of between 0.01 and 0.025 $cm^3 min^{-1} cm^{-2}$. Generally, industrial-scale permeation rates of between 0.6 and 2.2 $cm^3 min^{-1} cm^{-2}$ are achieved using the invented composite membrane.

FIG. 2 depicts a schematic diagram of the invented membrane in use. The process is designated generally as numeral 10. As a first step, hydrogen-laden feedstock fluid 12 is contacted with a first surface 14 of the composite membrane 16. The fluid 12 contacts the first surface 14 for a time and at a temperature sufficient to allow the surface 14 to catalytically oxidize the hydrogen gas to form rotons. These protons then pass through the membrane to a second surface 18 of he membrane 16. The now-passed protons re-associate as hydrogen gas for subsequent use or analysis 20.

In bench-top experiments, the flow rates averaged approximately 80–200 cc/min, with the carrier or sweep gas 28 flow at approximately 40–90 c/min.

As depicted in FIG. 1, the thickness "D" of the membrane can vary, depending on membrane fabrication techniques and reaction environments. Generally, however, thicknesses ranging from approximately 1 mil (1 mil=$\frac{1}{1000}$ of an inch) to approximately 1 millimeter are suitable. The effective area for permeation was 1.4 $cm^2$.

Reaction temperatures also are variable. The inventors have found that while preferred temperatures selected from between 600° C. and 1000° C. are suitable to effect efficient hydrogen transfer, reaction chamber construction must be considered. For example, in an exemplary reaction chamber 22 depicted in FIG. 2, the membrane mounting detail includes a sealant material 24 intermediate the second surface 18 of the membrane 16 and a non-reactive support substrate 26, such as an alumina support tube. This sealant material must be chosen so as to maintain its function at target temperatures while also remaining inert. Exemplary sealing material includes, but are not limited to, commercial brazing materials and glass sealants, and noble metals such as gold or platinum.

Figure 4:
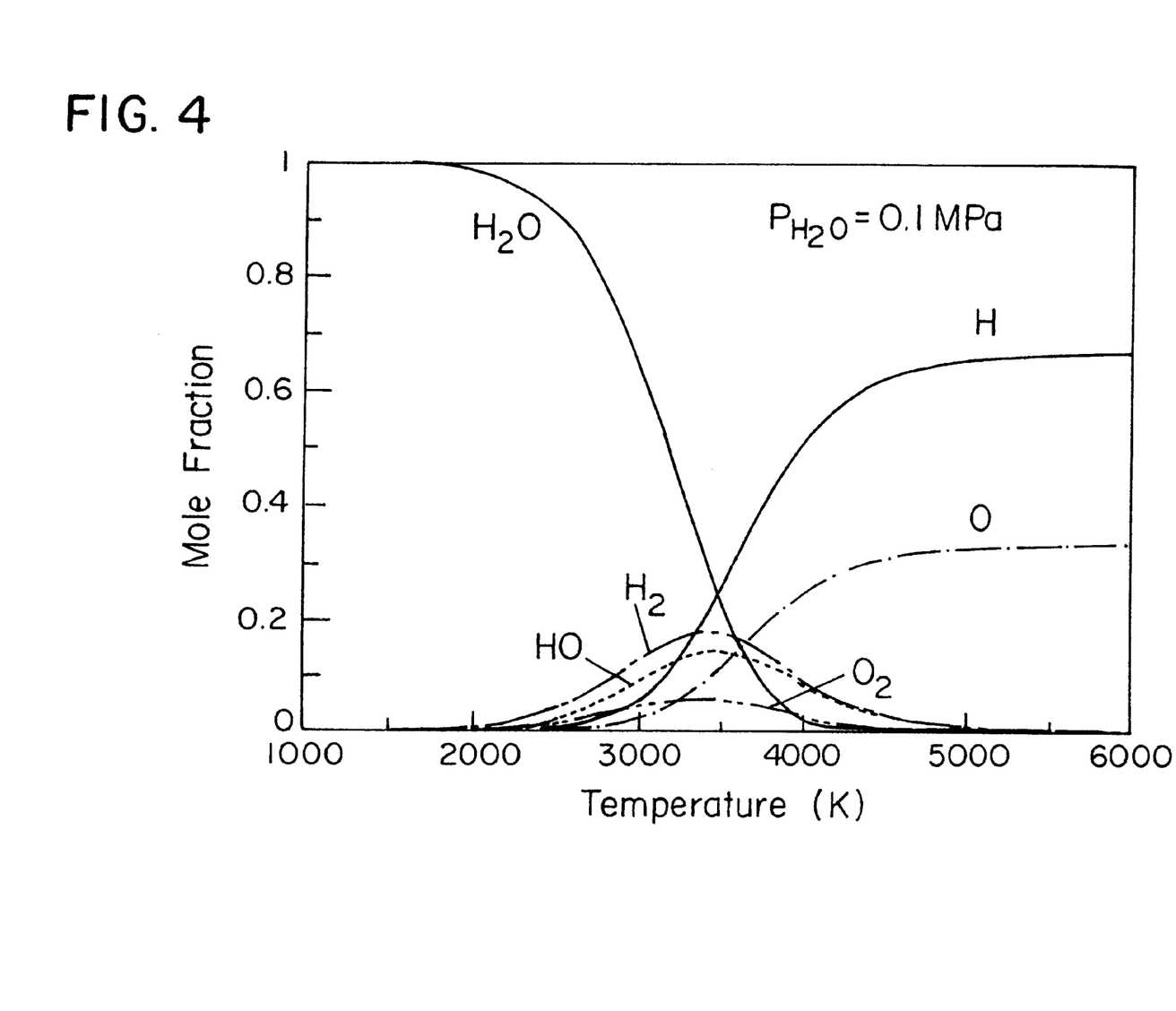
FIG. 4 is a graph from a publication depicting the relationship between mole fraction of the dissociated species and temperature, based on thermodynamic data for the dissociation of water into hydrogen and oxygen. Naito, H.; Arashi, H. *Solid State Ionics*, 79 (1995), pp. 366–370.
Figure 5:
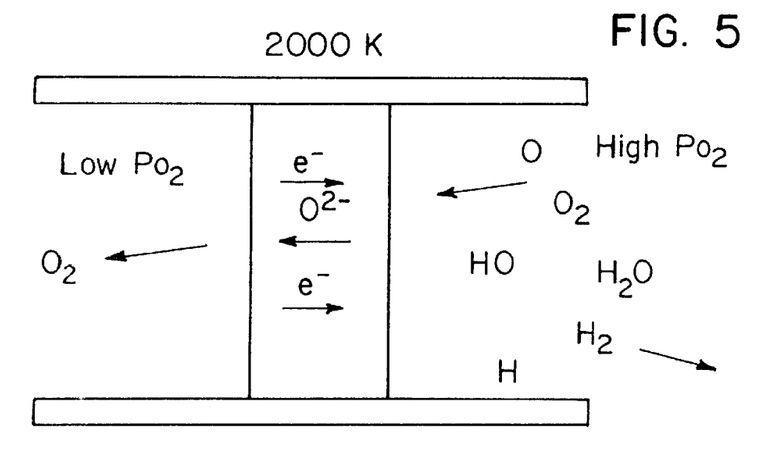
FIG. 5 is a schematic diagram of a literature-proposed mixed conductor process for producing hydrogen by splitting feed stream water demonstrating that high temperatures are required for the literature-proposed splitting process to proceed. Naito, H.; Arashi, H. *Solid State Ionics*, 79 (1995), pp. 366–370.
Figure 6:
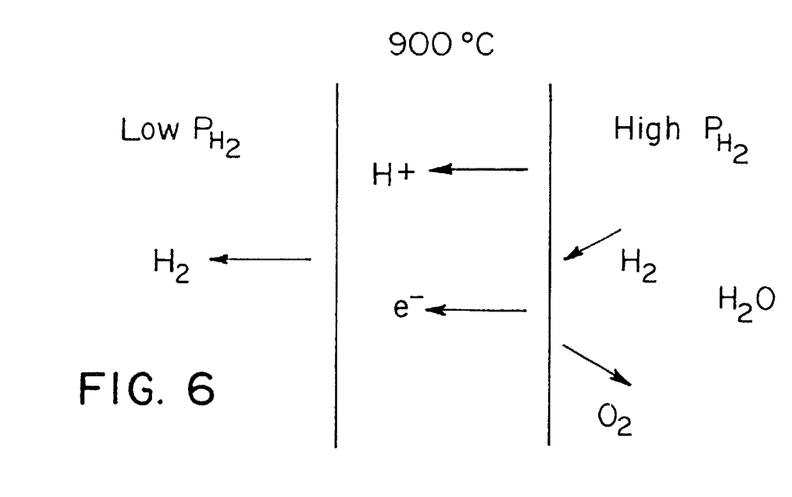
FIG. 6 is a schematic diagram of a mixed conductor, as used in accordance with the present invention, depicting the concept of hydrogen production by splitting water at high temperatures.
Figure 7:
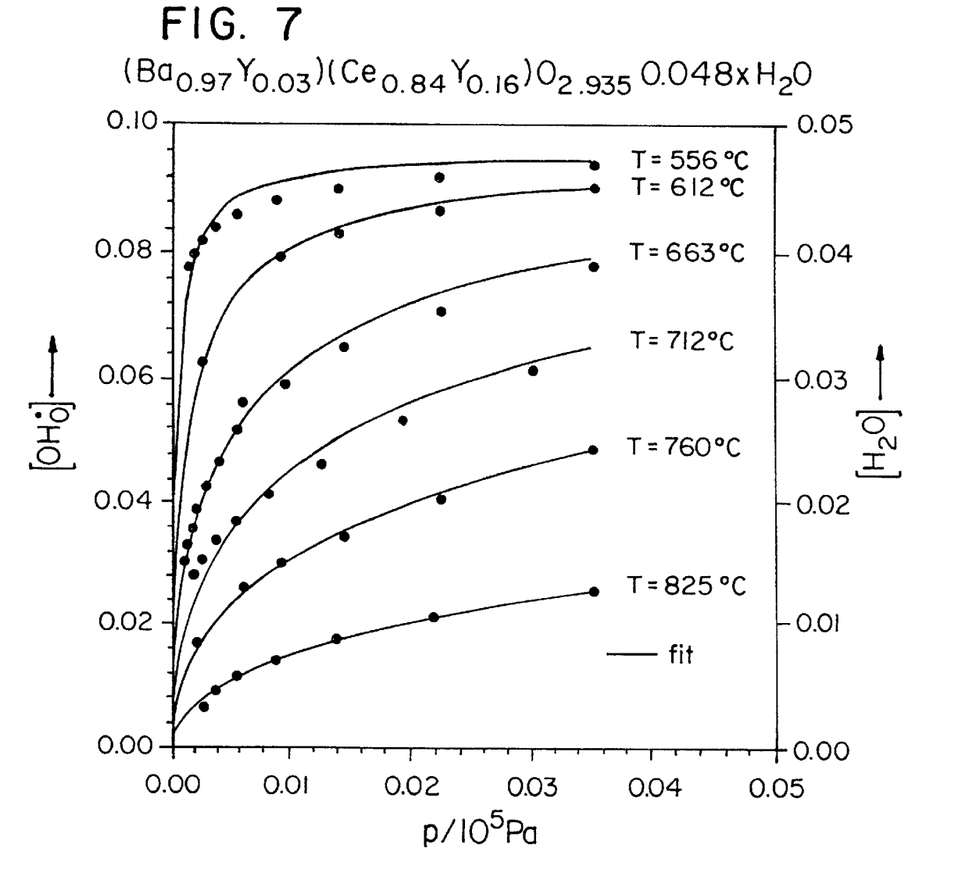
FIG. 7 is a graph depicting water absorption isotherms, as used in conventional systems comprising yttrium doped $BaCeO_3$ single crystals.

Literature-proposed hydrogen production systems require that the hydrogen production by water splitting occur at high temperatures (i.e., >1600° C.) and low oxygen partial pressures. Naito, H., Arashi, H. *Solid State Ionics*, 79, 366–70 (1995). Referring now to FIGS. 4 and 5 and the reference cited above, it has been proposed that the mole fraction of disassociated water species would increase with increasing temperature. Furthermore, it was suggested that with the increase in temperature and oxygen partial pressure on one side of the membrane, the disassociation species (e.g. $H_2$ and $O_2$) would be separated. As depicted in FIG. 6, it was the unexpected discovery of the present inventors that a properly composed membrane can even separate hydrogen from oxygen at temperatures as low as about 900° C.

Reaction sequence temperatures can be the result of the temperature of the applied hydrogen-containing feed fluid, externally applied heat, or a combination thereof. Temperature also can be effected by the temperature of any sweep gas or carrier gas stream 28 used in the system.

Gas leakage through the depicted configuration 10 was determined by replacing the hydrogen feed gas with helium and measuring the helium concentration in carrier gas 30 exposed to membrane permeate. For safety purposes, a nitrogen sweep sleeve 32 was provided to quickly remove any hydrogen leaking from the reactor.

Aside from the configuration depicted in FIG. 2, the invented composite also can be formed into a tube to be hermetically sealed intermediate with a pair of metallic tubes to form a leak-tight manifold. In a first step, the composite material is mixed with approximately 10 percent organics (binder, plasticizer, dispersant) as discussed in the fabrication section infra. The resulting slurry is then extruded. (By adding higher percentages of organics, the composite material also can be cast into a thin tape that can be shaped into a corrugated structure which could also serve as a reactor.)

A myriad of sealing materials can be used to join the now-formed extruded composite tube with the flanking tubes. For example, an exemplary brazing material to effect the seal is nickel-based, also containing 7 percent chromium, 4.5 percent silicon, 3.1 percent boron, 3 percent iron and less than 0.5 percent Carbon. A commercially available brazing material is Handy Flo 410 from Lucas-Milhaupt of Cudahy, Wis.

Briefly, the braze is formulated into a paste for leading into a syringe. Then, the braze is applied onto the membrane tube. The flanking tubes (constructed of an appropriate material, for example, Inconel) are then positioned on the paste and the entire assembly is fired. Firing involves ramping up the assembly to 1100° C. in about one hour and then holding for approximately 15 minutes. Cooling is then commenced. The entire process is conducted in a vacuum of from $10^{-8}$ to $10^{-5}$ torr.

In one scenario, one of the tubes supplies the hydrogen-laden fluid to the composite, while the other tube, downstream from the first tube, serves as a means of egress for the fluid from which hydrogen is extracted. The outside of the manifold is either bathed in a carrier gas or subjected to negative pressure to direct the extracted hydrogen to its final destination.

Of course, the application of the various feedstreams and sweep streams can be reversed; that is, the carrier gas can pass through the manifold to carry away any hydrogen permeating through from the inside to the outside surface of the composite tube.

As noted supra, a typical ceramic-based material is combined with catalytic metal to arrive at the invented composite material. Initial preparation of, for example, BCY material includes grinding together barium carbonate, cerium oxide and yttrium oxide and subsequently adding isopropyl alcohol to achieve homogeneity of the mixture. Milling of the homogeneous mixture is performed overnight. The resulting milled mixture is heated to dryness and subsequently calcined several times until the desired phase purity is achieved. A more complete protocol of ceramic-material preparation is found in Jie Guan et al. "Transport Properties of $BaCe_{0.95}Y_{0.05}O_{3-\alpha}$ Mixed Conductors for Hydrogen Separation," Solid State Ionics 100, 45–52 (1997, Elsevier Science B. V., Amsterdam.

The resulting ceramic material generated from the protocol disclosed in the previous paragraph is then combined with the electron-conducting material. In one method, ceramic powders and powders of electron-conducting metal are vibratory-milled in isopropyl alcohol for approximately 24 hours, subsequently dried and screened to 100 mesh. The resulting powder is then either uniaxially pressed into pellets ($\approx$2 cm in diameter) or tape-casting slips are formulated with a solvent/binder/plasticizer system. In the later case, the powders are dispersed in the organic system, cast onto a glass substrate, and leveled to a desired thickness. A predetermined diameter die is used to punch out membrane disks. Then the organics are removed through thermal decomposition by slow heating to approximately 450° C. in flowing oxygen maintained at a pressure of $\approx$2.5 torr. The resulting tapes and pellets were then sintered at temperatures not to exceed the melting temperature of either material comprising the homogenous composite. Sintering temperatures of from 1300° C. to 1600° C. are typical. Such sintering is necessary to prevent interconnected porosity which is detrimental to a hydrogen-specific transport mechanism.

A more complete protocol for combining the ceramic material with the conducting metal to form the cermets described herein is found in pages 44–46 of Jie Guan, "CERAMIC MEMBRANES OF MIXED IONIC-ELECTRONIC CONDUCTORS FOR HYDROGEN SEPARATION," A Dissertation Presented to the Academic Faculty of the Georgia Institute of Technology, Jun. 1998. The entire dissertation is publicly available at the Institute, and incorporated herein by reference.

Volume percent of the catalytic metal to the entire membrane monolith can vary from 1 to 60 percent, but more preferably varies between 20 and 60 percent. Hydrogen permeation rates depicted in FIGS. 1 and 3 were obtained with Nickel chosen as the catalytic metal, and present at approximately 40 volume percent to the membrane, overall.

In summary, the membrane serves to first transform hydrogen gas contained in a feed fluid to its respective protons. Transport of the ions then occurs through the membrane at a rate that is roughly inversely proportional to the thickness of the membrane.

To maximize the hydrogen permeability, the electronic and protonic conductivities should be comparable in magnitude, and the sum of the two transference numbers should approach unity.

In hydrogen permeation using the invented composites (such as a Ni-BCY cermet or Pd analogs), the driving force is the electrochemical potential difference across the membrane, which is related to hydrogen concentration difference. The inventors found that cermet permeation tests revealed that the Nernst potential is not very sensitive to the operating temperatures discussed herein. In essence, the effective potential equals the Nernst potential minus the polarization. At the relatively high temperatures utilized herein, polarization is lower. This results in the effective potential being higher. Also, the ambipolar conductivity (i.e., the combined protonic and electronic conductivity) is higher. In essence, the invented membrane facilitates more of a potentiostatic process, compared to the galvanic scenarios discussed supra. This phenomenon provides much higher permeation rates than at lower temperatures. Permeation rates of between 0.1 and 50 $cm^3min^{-1}cm^{-2}$ are attainable using the invented membrane and process disclosed herein, particularly if even thinner membranes are utilized.

The features disclosed in the present description, example and claims, both separately and in combination thereof, are material for realizing this invention and diverse forms thereof. The invention is further illustrated by the following examples, which are not to be construed as limiting, but merely as an illustration of some preferred features of the invention.

A method of producing hydrogen from feed stream of the present invention will be illustrated in the following example. However, it should be noted that the invention may be used to prepare an oxygen enriched stream as hydrogen is removed from the feed stream by permeation through the membrane.

The inventors have surprisingly and unexpectedly found that by using proton conductor membrane, the operating temperature is lowered to about 900° C. and the membrane automatically separates the hydrogen. In contrast, literature-proposed systems required temperatures between 1700° C.–3000° C. depending on the membrane composition. Naito, H., Arashi, H. Solid State Ionics, 79, 366–70 (1995).

EXAMPLE

Example 1

Preparation and Testing of BCY/Ni Membrane $BaCe_{0.80}Y_{0.20}O_3$ (BCY) was prepared by mixing appropriate amounts of $BaCO_3$, $CeO_2$ and $Y_2O_3$ and then calcining the mixture at 1,000° C. for 12 hours in air. The resulting powder was then ball-milled and calcined again at 1,200° C. for 10 hours in air. The resulting BCY powder was determined to be phase-pure using X-ray diffraction. The phase-pure BCY powder was mixed with 40 percent (by volume) nickel powder to increase its electron conductivity. A sintering aid (2.0 percent (w/w) $Ba_3B_2O_6$) was added to the resulting powder with mortar and pestle and the powder mixture was uniaxially pressed and sintered for 5 hours at 1,400° C. to 1450° C. in 4 percent hydrogen in argon mixture. The sintered pellet had approximate dimensions of 0.75 inch diameter by 1 mm, and its density after sintering was approximately 98 percent of theoretical (7.337 g/cm$^3$). The pellet served as membrane (14) in FIG. 2.

At one end of an Inconel 600 tube (0.750 inch outer diameter by 0.625 inner diameter by 2 inches long), the inside diameter was increased from 0.625 inches to 0.700 inches over a length of 1 mm from the end of the tube. This provided a shoulder on which the BCY/Ni membrane (14) could rest. The diameter of the BCY/Ni membrane (14) was reduced by grinding so that it would fit inside the now-machined Inconel tube and be supported by the shoulder that had be prepared through machining.

Brazing material (Handiflo 410) was placed between the Inconel tube and the BCY/Ni membrane. The Inconel tube with the BCY/Ni membrane and Handiflo 410 as placed into a high-vacuum furnace in an upright position with the pellet facing upward. The pressure inside the furnace was reduced to $10^{-6}$ to $10^{-7}$ torr and the furnace was heated at a rate of 400° C./hour to a temperature of 1,100° C. and maintained at that temperature for a period of about 10 to 15 minutes. After cooling to room temperature at a rate of about 400° C./hour under vacuum, the sample was removed from the furnace and checked for leaks using pressurized helium. No leaks were detected.

To test the promotion of water splitting, the Inconel tube with BCY/Ni membrane was attached to a stainless steel tube (26) using a Swagelok fitting. The furnace with the sample described above was evacuated and then back-filled with helium gas, after which it was heated to 850° C. under flowing helium. At 850° C., the sample was checked for leakage by measuring the helium concentration in the sweep gas (30); no leakage for helium through the sample or the seal was detected. During all measurements, the sweep gas (30) flowed at a rate of 85 cm$^3$/min. The zero-point hydrogen ($H_2$) concentration in the sweep gas (30) was measured to be 0.040–0.074 percent $H_2$ when dry helium was flowing as the feed gas (12), i.e. when the helium feed gas flowed directly into the furnace without first bubbling through water. When the feed gas was switched to a wet condition by flowing it through water at a temperature of 40° C., the $H_2$ concentration in sweep gas (30) increased to 0.24 percent at 850° C. Increasing the furnace temperature to 900° C. and the water temperature to 70° C,. the $H_2$ concentration in the sweep gas (30) increased to 0.59 percent.

All references cited herein are hereby incorporated by reference.

It is understood that this invention is not confined to the particular embodiments herein illustrated and described, but embraces all such modified forms thereof as come within the scope of the following claims.

The present invention may be embodied in other specific forms without departing from its spirit or its central characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A method of producing hydrogen comprising:
   (a) providing a feed stream comprising water;
   (b) contacting at least one proton conducting membrane adapted to catalyze the decomposition of water into hydrogen and oxygen and to separate the hydrogen from the oxygen with the feed stream;
   (c) splitting the water into hydrogen and oxygen at a predetermined temperature; and
   (d) separating the hydrogen from the oxygen.

2. The method of claim 1, wherein the feed stream is a fluid.

3. The method of claim 2, wherein the feed stream comprises water vapor.

4. The method of claim 3, wherein the proton conducting membrane comprises a proton conductor and a second phase material.

5. The method of claim 4, the permeability of hydrogen through the proton conducting membrane is significantly greater than the permeability of oxygen through the proton conducting membrane such that a hydrogen stream substantially free of oxygen is produced.

6. The method of claim 4, wherein the proton conductor comprises a lanthanide element, a Group VIA element, and a metal ion selected from the group consisting of Group IA elements, Group IIA elements, and combinations of these elements.

7. The method of claim 6, wherein the proton conductor comprises cerium, oxygen, and a Group IIA element selected from the group consisting of barium, strontium, and combinations of these elements.

8. The method of claim 6, wherein the proton conductor further comprises yttrium.

9. The method of claim 7, wherein the second phase material is selected from the group consisting of platinum, palladium, nickel, iron, cobalt, chromium, manganese, vanadium, silver, gold, copper, rhodium, ruthenium, niobium, zirconium, tantalum, and combinations thereof.

10. The method of claim 9, wherein the second phase material is selected from the group consisting of nickel, palladium, niobium, and combinations thereof.

11. The method of claim 1, wherein the predetermined temperature is in the range of between about 600° C. and 1,700° C.

12. The method of claim 11, wherein the predetermined temperature is in the range of between about 600° C. and 1,000° C.

13. The method of claim 12, wherein the predetermined temperature is in the range of between about 600° C. and 900° C.

14. The method of claim 1, wherein the predetermined temperature is in the range of between 800° C. to 1500° C.

15. The method of claim 1, wherein the proton conducting membrane has a hydrogen permeation rate that increases with increasing temperature in the temperature range of between 600° C. and 900° C.

16. A method of producing hydrogen comprising:
   (a) providing a feed stream selected from the group consisting of water; a synthesis gas comprising water; a coal gas comprising water; a combustion gas comprising carbon monoxide, carbon dioxide, hydrogen, and water; and combinations thereof;
   (b) contacting at least one proton conducting membrane adapted to catalyze the decomposition of water into hydrogen and oxygen and to separate the hydrogen from the oxygen with the feed stream, the proton conducting membrane comprising a proton conductor and a second phase material, wherein the proton conductor comprises yttrium, a Group IIA metal, a lanthanide, and a Group VIA element and the second phase material is selected from the group consisting of platinum, palladium, nickel, iron, cobalt, chromium, manganese, vanadium, silver, gold, copper, rhodium, ruthenium, niobium, zirconium, tantalum, and combinations thereof;

(c) splitting the water into hydrogen and oxygen at a predetermined temperature; and (d) separating the hydrogen from the oxygen; wherein separating the hydrogen from the oxygen shifts the gas stream splitting equilibrium toward the production of more hydrogen.

17. The method according to claim 16, wherein the second phase material is selected from the group consisting of palladium, nickel, niobium, and combinations thereof.

18. The method according to claim 17, wherein the predetermined temperature ranges from about 800° C. to about 1,700° C.

19. The method of claim 16, wherein the proton conducting membrane has a hydrogen permeation rate that increases with increasing temperature in the temperature range of between 600° C. and 900° C.

20. A method of producing hydrogen, comprising:

(a) providing a feed stream comprising water;

(b) contacting at least one proton conducting membrane adapted to catalyze the decomposition of water into hydrogen and oxygen and to separate the hydrogen from the oxygen with the feed stream, the proton conducting membrane comprising a proton conductor and a second phase material, wherein the proton conductor comprises yttrium, a Group IIA metal, a lanthanide, and a Group VIA element, and the second phase material is selected from the group consisting of platinum, palladium, nickel, iron, cobalt, chromium, manganese, vanadium, silver, gold, copper, rhodium, ruthenium, niobium, zirconium, tantalum, and combinations thereof;

(c) splitting the water into hydrogen and oxygen at a predetermined temperature; and (d) separating the hydrogen from the oxygen.

21. The method of claim 20, wherein the second phase material is selected from the group consisting of pailadium, nickel, niobium, and combinations thereof.

22. The method of claim 21, wherein the predetermined temperature ranges from about 600° C. to about 1,700° C.

23. The method of claim 21, wherein the proton conductor comprises cerium, oxygen, and a metal selected from the group consisting of barium, strontium, and combinations thereof.

24. The method of claim 20, wherein the predetermined temperature is in the range of between 800° C. to 1500° C.

25. The method of claim 20, wherein the proton conducting membrane has a hydrogen permeation rate that increases with increasing temperature in the temperature range of between 600° C. and 900° C.

* * * * *

UNITED STATES PATENT AND TRADEMARK OFFICE
CERTIFICATE OF CORRECTION

PATENT NO. : 6,468,499 B1
DATED : October 22, 2002
INVENTOR(S) : Balachandran et al.

It is certified that error appears in the above-identified patent and that said Letters Patent is hereby corrected as shown below:

Column 5,
Line 44, "membranes" should be -- membrane --.

Column 6,
Line 3, "rotons" should be -- protons --.
Line 5, "he" should be -- the --.

Column 10,
Line 21, after "4," insert -- wherein --.

Column 12,
Line 16, "pailadium" should be -- palladium --.

Signed and Sealed this

Fifteenth Day of April, 2003

JAMES E. ROGAN
*Director of the United States Patent and Trademark Office*